(12) United States Patent
Costigan et al.

(10) Patent No.: US 10,068,088 B2
(45) Date of Patent: Sep. 4, 2018

(54) METHOD, COMPUTER PROGRAM AND SYSTEM THAT USES BEHAVIORAL BIOMETRIC ALGORITHMS

(71) Applicant: BehavioSec, Lulea (SE)

(72) Inventors: Neil Costigan, Lulea (SE); Ingo Deutschmann, Merseburg (DE); Tony Libell, Lulea (SE); Johanna Skarpman Munter, Lulea (SE); Peder Nordström, Lulea (SE)

(73) Assignee: BehavioSec, Lulea (SE)

(*) Notice: Subject to any disclaimer, the term of this patent is extended or adjusted under 35 U.S.C. 154(b) by 212 days.

(21) Appl. No.: 15/048,021

(22) Filed: Feb. 19, 2016

(65) Prior Publication Data

US 2016/0180083 A1 Jun. 23, 2016

Related U.S. Application Data

(63) Continuation-in-part of application No. 13/866,183, filed on Apr. 19, 2013, now Pat. No. 9,298,912.

(60) Provisional application No. 61/637,559, filed on Apr. 24, 2012.

(51) Int. Cl.
| | |
|---|---|
| *G06F 21/55* | (2013.01) |
| *G06F 21/31* | (2013.01) |
| *G06K 9/00* | (2006.01) |
| *G06K 9/62* | (2006.01) |
| *G06F 21/32* | (2013.01) |

(52) U.S. Cl.
CPC .......... *G06F 21/55* (2013.01); *G06F 21/316* (2013.01); *G06F 21/32* (2013.01); *G06K 9/00355* (2013.01); *G06K 9/00899* (2013.01); *G06K 9/6296* (2013.01); *G06F 2221/2133* (2013.01)

(58) Field of Classification Search
CPC .. G06F 2221/2133; G06F 21/50; G06F 21/55; G06F 21/31; G06F 21/316; G06F 21/32; G06K 9/00355; G06K 9/00855; G06K 9/00899; G06K 9/62; G06K 9/6296
See application file for complete search history.

(56) References Cited

PUBLICATIONS

V., Ragavi and Geetha, G., Are You Human? A Shift from Knowledge Factor to Inherence Factor (Aug. 7, 2012). The IUP Journal of Systems Management, vol. IX, No. 4, Nov. 2011, pp. 20-25. Available at SSRN: https://ssrn.com/abstract=2125820 (Year: 2011).*

* cited by examiner

*Primary Examiner* — Michael J Pyzocha
*Assistant Examiner* — Alexander R Lapian
(74) *Attorney, Agent, or Firm* — Michael J. Feigin, Esq.; Feigin and Fridman LLC

(57) ABSTRACT

A computer-implemented method, computer program product, and system for determining whether a user exhibits machine behavior, or does not exhibit human-like behavior, thereby to authenticate the user for access to a software service.

18 Claims, 3 Drawing Sheets

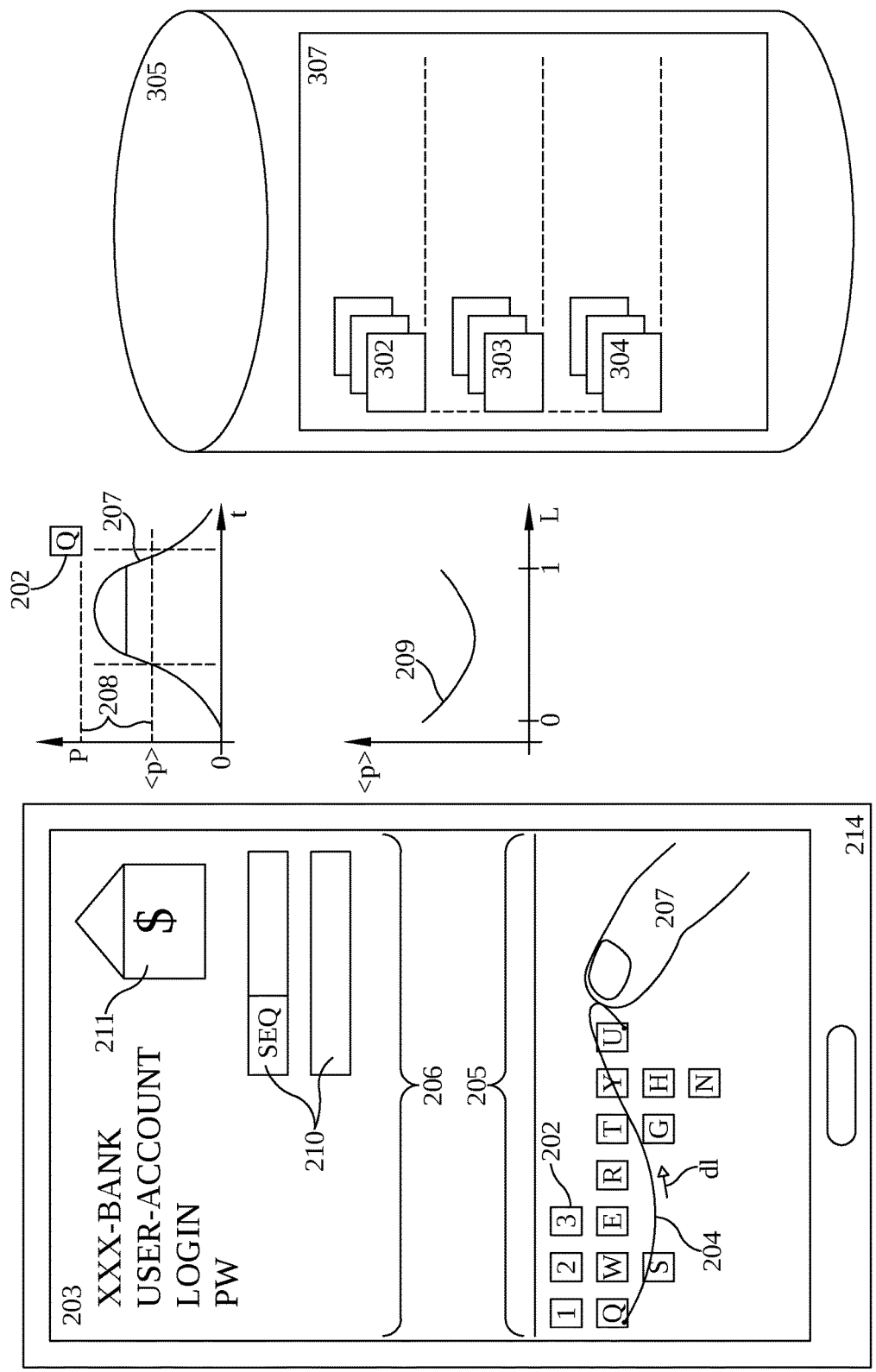

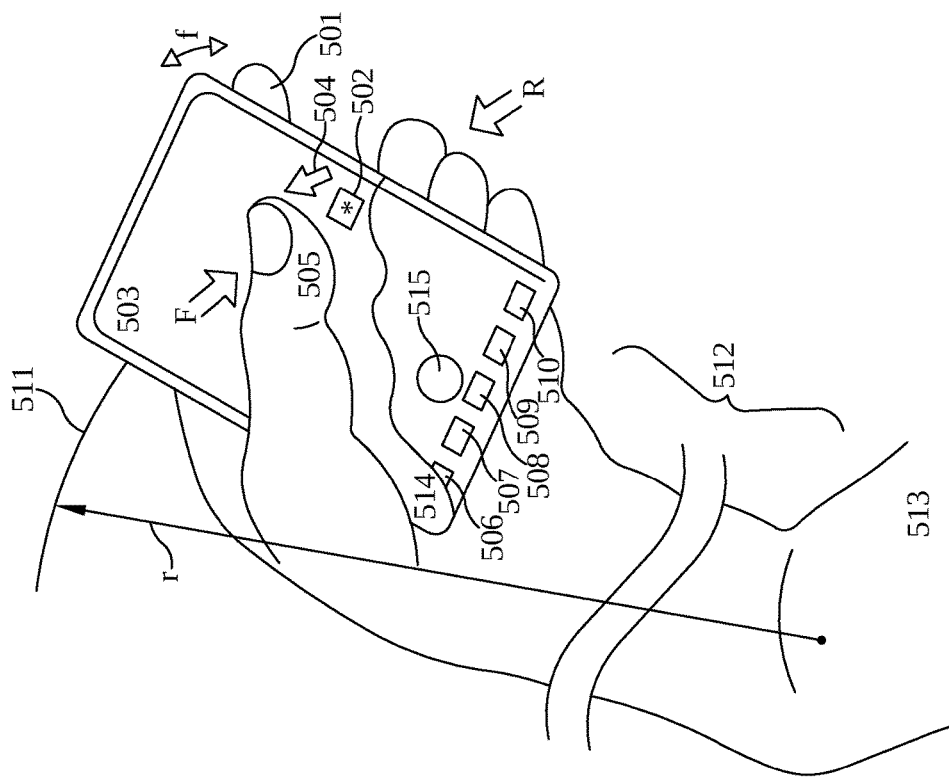
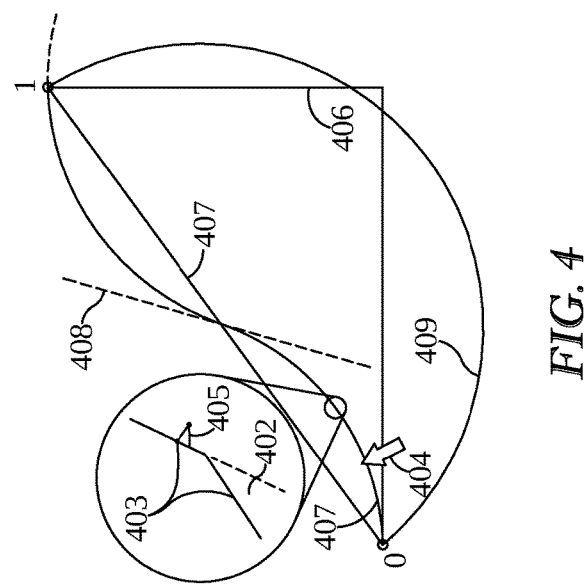
FIG. 5
FIG. 4

METHOD, COMPUTER PROGRAM AND SYSTEM THAT USES BEHAVIORAL BIOMETRIC ALGORITHMS

CROSS-REFERENCE TO RELATED APPLICATIONS

The present application is a continuation-in-part of U.S. patent application Ser. No. 13/866,183 filed on May 19, 2013, which claims the benefit of U.S. Provisional Application No. 61/637,559 filed on May 24, 2012. The disclosures of the above applications are incorporated herein by reference.

BACKGROUND OF THE INVENTION

1. Field of the Invention

The principles of the present disclosure describe a method, computer program and system that uses behavioral biometric algorithms that gather, filter, analyze and distinguish human swipe input sequence behavior from machine behavior. Quantified types of behavior may include, but are not limited to, angle, acceleration, sequence, flight, pressure, quotient, and velocity. More particularly, the present disclosure relates to the detection of human behavior on desktops and hand-held devices such as, but not limited to, smart phones, touch pads and tablets and handheld computers as well as so called transformer devices (tablets with a removable keyboard), to distinguish and avoid any abusive behavior by machines simulating human behavior on such devices. Thus this disclosure describes a method for differentiating between a human user interacting with a system and a machine interacting with the system, based on recognizing typical human-like behavior and/or expected machine-like behavior, in input measured on a keyboard, a mouse and/or other sensory input mechanisms on different devices.

2. Description of the Related Art

Typically, distinction between machine behavior, like that of internet-bots, and general human behavior, is accomplished using the higher complexity of human behavior. One such distinction tool, known as captcha, has been well known for several years. "Captcha" is an acronym for "Completely Automated Public Turing test to tell Computers and Humans Apart." A captcha is a type of challenge-response test used in computing to determine whether or not the user is human. Such a text-based progressive captcha test is disclosed in US Patent application publication number 2009/0113294.

U.S. Pat. No. 8,904,493 describes image-based challenge-response testing, in which the user responds to a test which is formulated to be simple for a human, but difficult for a machine to complete.

However, the main disadvantage of challenge-response tests of these types is the need for a conscious response from the user, which is often boring for the user.

Accordingly, it is an object of the present invention to provide a test for distinguishing machine behavior from general human behavior, without requiring a conscious response from the user, i.e. in the background. Another object of the present invention is to use sensor-data optionally available from the user-device to improve such a test.

SUMMARY OF THE INVENTION

The present disclosure describes a method, a computer program algorithm for executing the method, and a computer-system executing the algorithm. The present invention overcomes the deficiencies and limitations discussed in the Background section at least in part by providing innovative systems, programs and methods for verifying that a user device, which seeks access to a software service, is being operated by a human being. The aim of this invention is to detect human-like and/or machine-like behavior in the background. This is done by collecting information relating to interactions of the user with the user device, namely with an input module thereof, and validating collected information, and optionally additional sensor-data, using several methods in a fuzzy manner as described in the earlier application of the inventors listed in the Related Applications section, and as further explained in the present disclosure. Specifically, the user may be unaware of gathering of information relating to user behavior.

It is a particular feature of the present invention that biological and physical parameters of any human-being and/or bot-program are used in the input process during the interaction of the user with the device, in order to limit the variety or diversity of the direct input received from the user, such as text, and/or of further interaction data, such as data received from controls and sensors, to be realistic.

Specifically, just like the trajectory of a stone thrown into the air can always be described by a parabolic curve defined and limited by two parameters, biological and/or physical parameters may be used to identify a human user. For example, biological parameters may include response-time, body-heat, pulsation-frequency and the like, and physical parameters may include the inertial mass of body parts, limited motion about inertial body joints, damping of self-vibration of hand-held devices and the like. On the other hand, the parameters indicative of bot-programs are high-speed execution, direct input only of a necessary or required input-set, straight movements of the mouse-pointer, ideal random behavior and the like.

Due to the fact that the unconscious behavior of a human user is very different from that of a bot-program, distinction between the two is possible, in a fuzzy manner, without asking the user for a conscious response.

There is thus provided in accordance with an embodiment of the present invention a computer-implemented method comprising the following steps:

receiving, via at least one input module of a user-device, an input-set of data, necessary for a request for access to a software service, the input-set of data consciously generated by a user, gathering from the user-device a data-set of data dependent at least on an unconscious behavior of the user when using the user-device, evaluating, based on the data-set, whether the user exhibits human-like behavior or machine-like behavior, and when the evaluating determines that the user exhibits machine-like behavior, or does not determine that the user exhibits human-like behavior, executing a bot-routine.

There is further provided, in accordance with an embodiment of the present invention, a computer program product comprising a non-transitory computer-usable medium including instructions which, when executed by a computer, cause the computer to the steps of the above disclosed method.

There is further provided, in accordance with an embodiment of the present invention, a computer system comprising one or more processors, the processors being configured to computer to the steps of the above disclosed method.

In some embodiments, the data-set comprises at least one of dwell time data, trajectory data, pressure data, acceleration data, deceleration data, velocity data, data relating to randomness of input, data relating to uniformity of actions, jitter data, pulsation data, distortion data, and life indicator data.

In some embodiments, the evaluating comprises detecting at least characteristic of the user-device, and using known features of user-devices having the at least one characteristic as part of the evaluating, the at least one characteristic including at least one of a type of computer platform, a type of browser, and an operating system used by the user in the user-device.

In some embodiments, the data-set comprises trajectory information relating to a trajectory traveled by a pointing element between two keys of the user-device, and the evaluating comprises identifying at least one of specific keys crossed by the trajectory, a lag-time between key touching being greater than a threshold, deviation from a straight line or curve, and jitter present during traversal of the trajectory, thereby to identify the data-set as exhibiting human-like behavior.

In some embodiments, the data-set comprises randomized elements, and the evaluating comprises detecting a substantially Gaussian distribution of the randomized elements, thereby to identify the data-set as exhibiting machine-like behavior.

In some embodiments, the data-set comprises information relating to pressure applied by the user to keys of the user-device, and the evaluating comprises detecting at least one of excessive uniformity in the applied pressure and excessive uniformity in the portion of the key to which pressure is applied, thereby to identify the data-set as exhibiting machine-like behavior.

In some embodiments, the gathering takes place prior to the user providing the input-set of data.

In some embodiments, the evaluating comprises evaluating whether a human would be physically able to provide the data in the data-set, and, if the human would not be physically able to provide the data, carrying out the executing step.

In some embodiments, the evaluating comprises actively triggering at least one distortion, expected to cause a specific reaction, discernable in the data-set, if the user-device is operated by the human, thereby to identify whether the user exhibits the human-like behavior.

In some embodiments, the bot-routine includes at least one of interrupting transmission of the input-set from the user-device to the software service; identifying the user by obtaining additional user information or system information; storing the obtained additional user information or system information in hashed form in a list of users suspected not to be human; erasing the input-set from the user-device; creating a counter tracking the number of times wrong input data was provided for the user, or updating the counter; and if the counter exceeds a threshold, or increases rapidly, storing the obtained additional user information or system information in hashed form in a black list of users.

In some embodiments, the evaluating comprises comparing the number of characters in an input field of a data collection form with the number of characters in the data input, thereby to determine at least one of a score and a confidence of the received input data.

The novel features of the present invention are set forth in the appended claims. The invention itself, however, both its construction and its mode of operation, together with additional advantages and objects thereof, will be best understood from the following detailed description when read with reference to the accompanying drawings.

BRIEF DESCRIPTION OF THE DRAWINGS

FIG. 2 is a schematic illustration of a step of conscious data-input into an input module of a user-device, in accordance with an embodiment of the teachings herein;

FIG. 3 is a schematic illustration of a structure of a multidimensional data-set in accordance with an embodiment of the teachings herein;

FIG. 4 is a schematic illustration of an exemplary type of unconscious data of mouse-pointer-movement usable in a method in accordance with an embodiment of the teachings herein; and FIG. 5 is a schematic illustration of exemplary types of sensor data collected by the user-device and usable in a method in accordance with an embodiment of the teachings herein.

DETAILED DESCRIPTION

Figure 1:
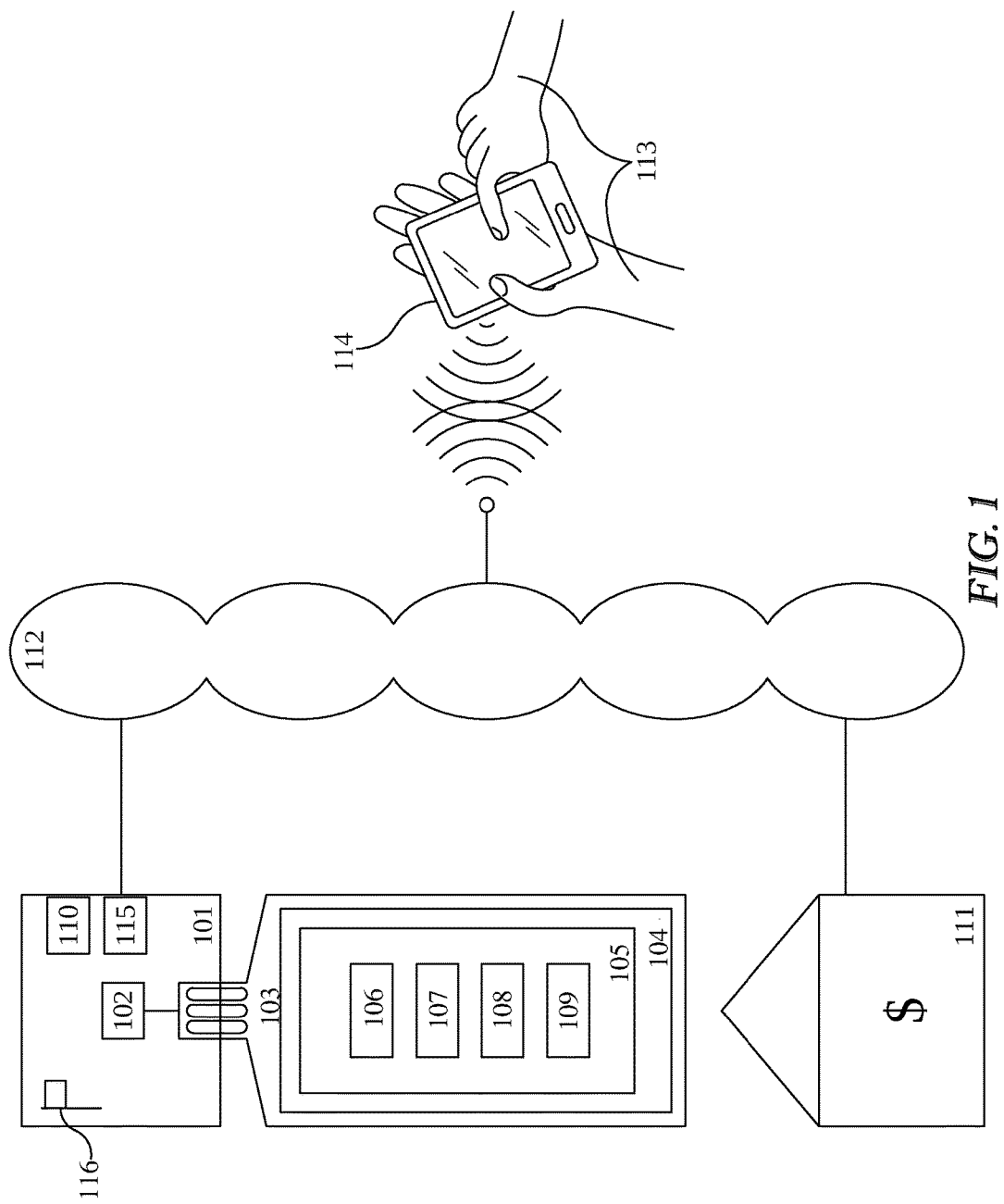
FIG. 1 is a schematic illustration of a computer system, program product and method in accordance with embodiments of the teachings herein.

The technology described herein includes systems, programs and methods for verifying that a user device, which seeks access to a software service, is being operated by a human being. The systems and methods are typically use for validation of the user in software services, such as social platforms, databases, banking accounts, and/or controlling interfaces of computers and machines, but may also be used with respect to general usage of computers.

Thus, for each interaction or specific set of interactions of the user with one or more input components of the user device, such as a mouse, keyboard, touch-pad, sensor-pen and the like, the input data from the input component(s) and optionally additional sensor data, for example gathered from one or more sensors of the user device, such as an accelerometer, a gyroscope, a magnetometer, pressure-sensors and other sensors, is stored, and later the stored data is validated using several validation methods.

Furthermore, information may be gathered regarding the type of the device and the software running on the device. This can be a machine identifier, a device-ID, information about the operating system, the browser or other machine dependable information.

The validation methods disclosed herein use at least one data-set in addition to the input-set requested by the software service for access thereto. The additional data-set contains information beyond that contained in the input-set and required by the software service. Using more than one such additional data-set increases the mathematical dimension of data used for validation, and thus the statistical significance and/or safety of the fuzzy validation method.

Reference is now made to FIG. 1, which is a schematic illustration of a computer system, program product and method in accordance with embodiments of the teachings herein. As seen in FIG. 1, a computer system 101 includes a processor 102 connected to a computer program product 103, such as a memory-stick. The computer program product 103 includes a non-transitory computer-usable medium including instructions 104, which instructions are to be executed by processor 102. The instructions 104 include a method 105 comprising a receiving step 106, a gathering step 107, an evaluating step 108, and an executing step 109, which may, in some embodiments, be operated simultaneously in different threads.

The receiving step 106 receives from computer system 101 an input-set 110 of data, the input-set 110 including data necessary for a request to access to a software service 111 such as a banking application via a network 112 such as the Internet. The input-set 110 is consciously generated by a user 113 using a user-device 114, such as a hand-held smart-phone, which user device 114 wirelessly communicates with computer system 101 via the network 112.

The gathering step 107 gathers a data-set 115 of data, the data dependent on an unconscious behavior of user 113 when using user-device 114. The data-set 115 may include various types of data, such as dwell times, trajectory of mouse movements, and the like, as described in further detail hereinbelow.

The evaluating step 108 uses data-set 115 to evaluate whether user 113 presents human-like behaviors and/or machine-like behaviors. The evaluating step may raise one or more flags 116, indicating identification of machine-like behavior or non-human like behavior.

If the evaluating step 108 determines that the user 113 presents machine-like behaviors, or does determine that the user presents human-like behaviors, the executing step 109 executes a bot-routine to prevent access to software service 111 as requested by user 113.

For example, the input-set 110 requested by software service 111 may be a string of pure ASCII characters, uni-code characters, or the like, and data-set 115 may include any additional information relating to use and/or control of user device 114 collected from an input module of the device, such as mouse-movements, key-crossing, key-selects and the like. The input-data created by user 113 is a union of the input-set and the data-set.

The correlation between the input-data created by user 113 and data-set 115 is dependent on the computer platform (Windows, Mac, . . . ), browser (IE, Firefox, Chrome, . . . ) and device (desktop, tablet, smart-phone, . . . ) used, and may be different for different computer platforms, browsers, and devices. However, due to the general human traits of use of a computer system such correlation is statistically similar for such kinds of user-systems. Thus, in advance of the evaluation step, and based on a large number of requests for access made by each kind of user-device 114, the allowed or valid correlations are measurable, statistically derivable, and can be stored on a computer readable medium.

For each request to access a software service 111, the specific type of user-device 114 is detectable via the browser or via device information, and thus a specific statistic is selectable to determine whether the correlation between the input-data and the data-set obtained from use and/or of the device via input module is acceptable, in a statistical sense.

For example, user 113 may be using a Windows platform with a Firefox browser running on a smart-phone as user-device 114 and is required to input login data, such as his specific Login and secret password (PW), to gain access to his bank-account via a web-based banking software service 111 supported by computer system 101. To distinguish between human swipe input sequence behavior and machine-like behavior prior art methods, such as the method disclosed in the applications listed in the Related Applications section, may be used.

Reference is now made to FIG. 2, which is a schematic illustration of a step of conscious data-input into an input module of a user-device, in accordance with an embodiment of the teachings herein. As seen, one way to input login data by user 113 (FIG. 1) is for the user to swipe his finger 201 or his pen from the latest pressed key 202 over the touch-sensitive screen 203 to reach a different key 202 he wants to press next. A path or swipe 204 generated by such finger or pen movement may be different for different users 113 and/or at different times. However, a statistical threshold is assigned to the probability that a specific key 202 be crossed by the path 204. For example, if the user 113 want to write the sequence ' . . . qu . . . ' as part of his login data, it will be much more probable that the key 'S' is crossed by path 204 than the key 'N', due to the structure of a standardized keyboard 205, such as that included at the bottom of screen 203 of user device 214 for receiving text-input requested by web-service 206 of software-service 211, which text input will be displayed at the upper part of screen 203. A similar statistical evaluation may be made for any sequence of an input-set 210 provided by user 113.

Another way for the user 113 to input login data will be a separate touch for each key 202. Using the example hereinabove, in this scenario after the user touches the key for 'q' he lifts his finger 201 or his pen, and selects the key for 'u' without crossing any other keys 202. In such cases, the data-set 115 may be computed using the internal computer clock, and may include a key-press-time $t\_p$ for each of the keys 202 identifying the duration that the key was pressed, as well as a key-flight-time $t\_f$ identifying the time between successive key-presses. Additional data may include the exact location within the key that the finger 201 or pen press, for example it may identify that the finger 201 rests in the left bottom quadrant of the 'Q'-key 202 but on the right border of the 'U'-key 202. Additional control input used in data-set 115 may include span of the time needed to press each of the two keys 202 successively, i.e. the number of key-bounces. For example, the number of key-bounces may be 13 on 'Q'-key 202 but 8 on 'U'-key 202. Typically, bot-programs showing machine interaction will not present with the human characteristics described above.

In cases in which the input-device 214 and the basic operating system of the platform controlling this input-device 214 is pressure-sensitive in a discrete or continuous manner, such as a keyboard 205 with pressure-sensors below each key 202 or a smart-phone with a pressure-sensitive touch-screen 203, the data-set 115 may include a pressure-time-function 207 or a weighted mean value <p> of the pressure p applied to each key 202 or along moving path 204 with the infinitesimal line-parameter d1. A human user 113 will touch each key 202 with different pressure p, but within a user-specific value range 208 and with a typical form of the pressure-time-function 207. Also a continuous moving path 204 from 'Q' to 'U' would demonstrate a continuous pressure-path-function 209 over path 204 with a minimum of the mean-pressure-value <p> between the endpoints 0-1 of this path 204. However, machine behavior would typically entail equal pressure applied to each of the keys 202.

If the evaluating step 108, which watches the whole input-data sequence and carries out a fuzzy calculation of all the different likelihoods during this input-data sequence, rules that the input was done by a machine rather than by a human-being, input-data is ignored for the requested access, and a related bot-routine is started by the executing step 109 (FIG. 1). Otherwise, when the evaluating step 108 rules that the user is exhibiting human behavior, and only then, the input-set 110 (FIG. 1) is transmitted to the requested software service 111 (FIG. 1) to complete the access-request of the user 113 (FIG. 1).

Reference is now made to FIG. 3, which is a schematic illustration of a structure of a multidimensional data-set in accordance with an embodiment of the teachings herein. With respect to FIG. 3, an exemplary model 301 be a set of some or all methods for the evaluating step 108 suitable for different user-systems 302 and human traits 303 for a given request for a software service 111 (FIG. 1). The model 301 also contains parameters 304 necessary to validate the human-like input-data for each of the kinds of possible user-systems 302. The model 301 and the data thereof may be stored in a database 305.

Depending on the specific user-system 302 used when the user tries to access a software service 111 (FIG. 1) only a part of model 301 and database 305 will be active. Furthermore, in any given situation, only some of parameters 304 are suitable and/or available for evaluation of the specific data-sets 115 (FIG. 1) generated by the user 113 (FIG. 1). The generation of a portion of model 301 specific to the user and gathering the user-specific data-set 115 (FIG. 1) may be happen in the manner described hereinabove, or in any other suitable manner. The correlated parameters 304 may be fixed parameters, programmed based on reasonable values such as the value ranges for number and time of key-bounces which are given in the data-sheets of the input-devices, for example in the range of 100 us and 10 ms for keyboards. In other cases the correlated parameters 304 may be measured during a test-phase, in advance of use of the method described herein, the test phase including a plurality of input-tests for each supported user-system 302, the measured parameters being stored in form of statistical values for the specific measurement, such as values representing the median, variance and standard deviation. Another method of obtaining parameters 304 includes collecting information relating to behavior of the user 113 (FIG. 1) at least during a time-span before the user provides the input-set required for access, for example by collecting the floating average and the distribution of pressure p (FIG. 2) of the last 1024 keys 202 (FIG. 2) used for input by the user. More complex parameters 304, such as the likelihood of crossed keys 202 (FIG. 2) in the vicinity of a connecting path 204 (FIG. 2) between a given first pressed key and a given next pressed key from the set of all keys of a QWERTY- or QWERTZ-keyboard 205 (FIG. 2) are determinable by means of pattern recognition, for example based on Support Vector Machines running in the background of the platform.

Model 301 further includes some features typical to bots, especially use of poorly written or overly simple text or programming. For example, in order to gain getting access to a requested software-service 111 (FIG. 1) it is typically enough to transmit the right text-based input-set 110 (FIG. 1) in form of an input-string. Because the generating process of such a string is uninteresting and is not unique, in bots it will often be carried out by standard string manipulating methods of the programming language used by the crime bot-programmer. However, standard programmed string manipulating methods are very fast, and relative to a real input by a human, which typically span some seconds, such string manipulating methods are substantially instantaneous. Consequently, when a bot is providing the input string, the computer platform does not have enough time to switch to idle mode or to perform another task during the string filling process. As such, if an instantaneous or too fast filling of the input-string is detected, this is indicative of the string-filling user being a bot. Such bot-detection methods maybe manipulate a cookie in the browser or a file on the computer platform or may simply count a running number like the clock, during an estimated time span necessary for writing the input-data by a human. Another kind of bot-detection method may be based on the absence of a stored backup-string or backup-file of the input-buffer similar to the actual used input-string, on a 'near' in the cyclic metric of hexagonal number packages of the address-pointer of the input-string used in relation to a dummy input requested some steps before the relevant input-data is provided.

Similarly to the input of strings, other interactions between a bot and the user-device 114 (FIG. 1) will be significantly uniform. One of the simplest way to spoof human interaction by a bot employs direct random number values or simple functions of these, for example to determine a waiting period before "pressing" the next key in the input string. However, computerized random number generators produce a kind of highly normal (in the mathematically sense) distributed digits. This property of perfect randomness is detectable also if the randomness was transformed by a function. Perfect randomness, like the digits of pi=3.14159 . . . , is an ideal outside the (deterministic) physical reality. However, in each real behavior some patterns or cycles will occur. As such, detection of ideal randomness is indicative of a bot user as opposed to a human user. To detect such ideal randomness, an Omnibus-test or a runs-test, such as the Wald-Wolfowitz-test, may be used. If the likelihood given by the randomness-test exceeds a threshold, such as 95%, and a significance level thereof exceeds a threshold, then the interaction seems to be perfect and indicates a high likelihood of machine interaction of a bot, which may be followed by initiation of a related bot-routine by executing step 109 (FIG. 1).

Turning to FIG. 4, which is a schematic illustration of an exemplary type of unconscious data of mouse-pointer-movement usable in a method in accordance with an embodiment of the teachings herein, if the input-device 114 (FIG. 1) used by the user 113 (FIG. 1) supports the input of a steady curve 401, such as that provided by use of a computer-mouse or a touch-sensitive device, a continuous curve of a mouse-pointer 404 is derived. Due to the fact that the raw movement-data submitted by the input-device 114 (FIG. 1) comprises only discrete relative values of points 402 the resulting curve 401 written by the mouse-pointer 404 has to fit to a plurality of points 402 using mathematical methods, such as means-square-fit. One way to fit curve 401 is to calculate a polygonal chain with a fixed set of points 402 for each chain link 403. Each point 402 used for calculation may be spaced from such a chain link 403 which defines a line by a specific distance. Such spaces or jitters 405 about the line are caused by the discrete interactions of the user with different components of the real user-device 114 (FIG. 1). If no jitter, or only an idealistic minimal jitter 405, is detected by the estimation of a chain link 403, it can be concluded that it is likely that this link 403 was calculated by a bot and a related bot-routine may be initiated by executing step 109 (FIG. 1). Because each curve 401 is approximable by chain links 403 of different length, estimation as described above is also suitable for different numbers of points 402 or chain links 403. Thus, a sequence of nested intervals may be estimated.

The most simple curves 401 typically used by bots may be described mathematically as constant lines 406 for a single dimension or as straight lines 407 directly connecting the end points 0-1. For these kind of curves 401, a general jitter 405 will be zero, and a related bot-routine will be initiated by executing step 109 (FIG. 1). All other curves 401, such as parabolas, hyperbolas or splines are of higher order and much more difficult to describe mathematically by a set of curve-parameters 304 (FIG. 3). Any curve 401 is describable mathematically with a line-parameter and some functions dependent on the line-parameter like position, length or curvature, where more complex curves require more curve-parameters. It is assumed that a machine or bot would not manually derive such a specific set of curve-parameters, and as such curve parameters would be lacking in machine-like behavior.

Such analysis of mouse-pointer movements is possible when relating to the computational user-device 114 (FIG. 1), but not with respect to real-world interactions. Real world interactions also have to fulfill additional limits, such as the physical and biological behavior of the input tools and of the user 113 (FIG. 1) himself.

The speed of movement of the mouse-pointer is limited not only by the software-parameters 304 (FIG. 3) of the mouse-control program running at the platform. A real user 113 (FIG. 1) needs some time span to move the input-means across a non-zero distance. The average velocity is given as the distance to span ratio. A human-being controlling his user-device 114 (FIG. 1) by hand will have an average input-moving velocity between five millimeters a second and fifty centimeters a second. To estimate this velocity, the moving distance of the input-device and the related clock-values are required. The former is technically limited by the possible area of the input-device, i.e. some centimeter for a touch-pad up to some decimeter of a mouse-pad or an input-pen. Additionally, the clock-values, at least at both end points 0-1 of curve 401 of the mouse-pointer 404, are a necessary part of the additional data-set 115 (FIG. 1) used by the method herein. Calculated input-moving velocities outside the range expected for a human will thus indicate a bot user, and a related bot-routine will be initiated by executing step 109 (FIG. 1).

Additionally, real input means will have an inertial mass. Specifically, in accordance with Newton's rule, the movement near the endpoints 0-1 has to be respectively accelerated from and decelerated to velocity of zero. Such acceleration/deceleration behavior of the mouse-pointer 404 movement may be identified by sampled clock-values, which in such cases have to be part of the additional data-set 115 (FIG. 1) and of the calculation used by the validation method. Due to the laws of physics, not all mathematically describable curves are allowed, and as such during equidistant time steps the length of the chain links 403 have to double respective to each other. If this does not happen, it is indicative of a bot and a related bot-routine will be started by executing step 109 (FIG. 1). The inertial mass of real input means will also limit the form of the curves 401 possible. At first all real curves 401 drawn by a single movement have to be continuous and have a curvature having limited smoothness. Furthermore depending on the force-time function typically used by a human-being to write something, which is usually a stepped function, the curve 401 has to have, stepwise, at least second order, such as a parabolic arch 408. Only a calculating computer is able to write special higher ordered curves 401 like splines or circles 409. Therefore, a stepwise estimating method based on the mean-value-theorem is able to check if the form of the curve 401 drawn was caused by the freedom of will of a human-being or is simply too perfectly calculated. The latter case, such as steps, straight, cubic or circle-forms, will indicate a bot and a related bot-routine will be initiated by executing step 109 (FIG. 1).

Reference is now made to FIG. 5, which is a schematic illustration of exemplary types of sensor data collected by the user-device and usable in a method in accordance with an embodiment of the teachings herein. As seen, hand-held user-devices 514, such as tablets or smart-phones, are generally used when held in one hand of a human being as user 513. When the thumb 505 of the same hand or a finger 501 of the other hand is used to press a key 502 or to move the mouse-pointer 504, a force F is applied to the user-device 514 and thus a physical response R of user-device 514 will occur. Due to the interaction being instantaneous, the response R will be time-correlated with the action of entering the input-data. The form of the response R may differ, depending on the kind of hand-held user-device 514 used and the method of entering the input-data. Thus, if the resulting force F is in a direction toward the center of mass of device 514, the user-device 514 will accelerate along the vector of force F, which acceleration is measurable by a three-axis acceleration sensor 506. Conversely, if the resulting force F is in a direction transverse to the center of mass of device 514, a rotation about the inertial axis of the device will occur, which rotation is measurable by a three-axis gyroscopic sensor 507. Small and short distributions of force F will result only in characteristic damped vibrations at resonant frequencies both of the user-device 514 itself and of the coupled hand-device-system about the rest position and the rest state of the device. Operation of such accelerations over a longer time span will result in any one of a chanced position, inclination or orientation, measurable with any one or more of position-sensors 508 such as GPS, inclination-sensors 509, and respective magnetic sensors 510. The trajectory 511 of the moved user-device 514 is generally limited by the range of motion of the human hand-arm-system 512, which has a radius r of about 30 cm. Finally it is possible that the user 513 is moving, for example by walking or by a vehicle. In such a case, a constant straight velocity may be additionally considered for any computed position data.

Depending on the kind of the user-device 514, at least some of the sensors 506, 507, 508, 509, and 510 may be included in the user-device 514. If the user-system enables the output of values collected from at least one such sensor, for example the acceleration sensor 506, as part of the data-set 115 (FIG. 1), measurement of the response R described above may be used in the evaluating step 108 (FIG. 1). Any missing response data, and any response data physically impossible for a hand-held device held by a human, is indicative of a bot user and a related bot-routine is initiated by executing step 109 (FIG. 1).

Using further sensors 515 integrated in hand-held devices, such as pulsation-sensors, temperature-sensors, microphones and cameras, may provide additional indications that a living subject is using the device. If the user-system enables the output of values collected from at least one sensor 515 as part of data-set 115, identification of distortions and indicators of life, such as warmth, sounds of breathing, slight pulsations of the device, and the like, may enable identification of the user as a human user as part of evaluating step 108 (FIG. 1). Lack of such distortions and/or indicators of life is indicative of a bot user and a related bot-routine is initiated by executing step 109 (FIG. 1).

Furthermore, active distortions such as vibrations, sounds, or optical effects, may be generated by the evaluating step 108 (FIG. 1), and may result in a physical or biological response of the human user 513, the environment of the user, and/or the user-device 514. For example, the subconscious of user 513 may be shocked by initiation of a short flicker of the screen 503, thereby to stimulate a jerky movement of the user. As another example, hypersonics may be used to detect any echo or to initiate a resonant vibration of parts of the device. If data from at least one of the sensors 506, 507, 508, 509, 510, and 515 is a part of the data-set 115 (FIG. 1), a distortion-method may be used as part of the evaluating step 108 (FIG. 1). Lack of an anticipated sensor response, for example following an actively generated distortion, is indicative of a bot user and a related bot-routine is initiated by executing step 109 (FIG. 1).

Returning to FIG. 1, the method for distinguishing whether the user currently creating input-data is a human-being or a bot may include at least three of the following characteristics or features, described with respect to the reference numerals shown in FIGS. 1 to 5:

1. The data gathering step 107 in mobile applications may be carried out using standard interfaces of the operating system, such as Android, iOS, Windows mobile or Windows 10. Additionally, Java script code in web-based environments may be used to gather data about the behavior of users 113. Raw behavioral data from keyboard 205 (FIG. 2), input devices such as a mouse (FIG. 4), and other sensors 506, 507, 508, 509, 510, and 515 (FIG. 5) may be processed into data-sets 115 that may contain relevant information, additional to the requested input-set 110. Different combinations of input consisting of time series data of delta timings and/or spatial interactions may also be extracted and may also form part of the data-set 115. For example, the pressure-values p (FIG. 2) and clock-values t (FIG. 2) of each selected point 402 (FIG. 4) on the touch-screen 203 (FIG. 2) may be recorded and associated with each-other in the data-set 115. Furthermore, time-data from a three-axis acceleration sensor may be recorded as part of data-set 115.

2. Identifying the machine and environment used based on the gathered machine dependable information, as best as possible. For example, if the user-device 114 is determined by detected browser information to be running a Firefox-Version 33 browser under Windows, additional information about the user-device 114 can be gathered using device identifiers provided by the operating system. Identification of the operating system, machine, and environment can result, for instance, in identification of the device as a smart-phone having a weight of 130 g and a metallic housing with a resonant frequency f (FIG. 5) of the housing of 10 kHz (as determined by a selected type-table). This information can form part of the data-set, as such a resonance can be detected using the idle-noise of the acceleration sensor 506 (FIG. 5).

3. Running the evaluating step 108 method for the input-data, including the input-set 110 requested by the software-service 111. Specifically, in addition to the text-based input, behavioral input is captured when the user provides the login and password information (FIG. 2) and the registration for a new user 113 may be entered, for example with the software-service 111 or in a suitable database. Exemplary services include:
   a. Opening a banking session
   b. Opening a session in a web browser
   c. Capturing web-based behavior when entering a transaction
   d. Capturing behavior on a mobile device while entering a login and password (FIG. 2) or a one-time password (OTP) token used for authentication of the session and the user 113

4. The evaluating step 108 tackles the evaluation problem in two different aspects: identifying machine-like behavior and/or identifying non-human behavior. Machine-like behavior is defined as behavior expected from a machine designed to resemble a human being. Examples of such behavior is overly uniform keyboard inputs (FIG. 2) or overly straight or smooth mouse movements. Non-human like behavior is considered to be any behavior that is impossible, or very unlikely, for a human to perform. To test data for this type of behavior, empirically established human traits are used, such as typical minimum timings between keypresses and expected jitter 405 (FIG. 4) in mouse movements and other sensor input. The data obtained from different modalities is then validated based on layers of a highly dimensional database 305 (FIG. 3), the layers individually designed to validate each combination of data in a relevant way. For example in the first layer the parameters 304 (FIG. 3) of typical movement of mouse-pointer 404 (FIG. 4) achieved by movement of a touching thumb 505 (FIG. 5) is stored, and described via a chain 403 (FIG. 4) of parabolic arches 408 (FIG. 4), i.e. a set of curvatures. In the second layer some typical accelerating values of the smart-phone as a whole during this kind of input are stored.

5. Watch for flags 116 raised by the evaluating step 108, and in case of such a flag being raised, use the executing step 109 to initiate the bot-routine running at computer system 101. In some embodiments the behavior is flagged as being machine generated directly on discovery, while other analyses are performed on the full length of data, from which a conclusion is drawn. In some embodiments, at least two of the following flags 116 are watched:
   a. Check for non-human like timings. To add robustness and to avoid excess alarms, single non-human like timings are ignored.
   b. Go through the full length of data on time series modalities to conclude with regards to uniformness, non-human like randomness, or distributions. To distinguish human from machine like behavior, all relevant measures of flights between keys 202 (FIG. 2), up and down key readings, and time between different key 202 (FIG. 2) readings are processed. Similarly, the time series of up and down release of buttons on mouse or other device sensors 515 (FIG. 5) is processed.
   c. Spatial modalities such as mouse movements, clicks and readings from sensors 506, 507, 508, 509, 510, and/or 515 (FIG. 5), such as gyrometer, accelerometer, and magnetometer on relevant user-devices 114 are validated by looking for expected human like behaviors. This is partially accomplished by confirming that actual spatial movements have occurred. Additionally, non-human like behavior, such as overly straight lines 407 (FIG. 4) or movements no jitter are analyzed and evaluated. It is decided, based upon on empirical experience, whether or not a behavior can be recognized as non-human like behavior.

The executing step 109 initiates a bot-routine when a not-human-like and/or a machine-like behavior was identified by evaluating step 108 and thus a flag 116 was raised. The executing step 109 may include the following steps, but is not limited thereto:

Breaking the transmission of the input-set 110 to the software-service 111 for which access was requested by the user 113. This may be accomplished by redirecting the input-set 110 to another location, such as a local memory associated with the executing step 109, or to a service-specific and responsibly managed trash-folder for rejected input-data, which may be located at the software-service 111 and/or at the computer program product 103 owned or licensed by the firm powering the software-service 111.

Grabbing user-specific information for accurately identifying the current user 113 or a small set of possible users including the current user 113. This may be accomplished by reading out the input-set 110, additional available user information such as name, birthday, address, email, telephone, credit-card-number and/or additional user-system information available, such as Internet-Protocol (IP) address, Media-Access-Control (MAC) address, browser-profiles, Multipurpose Internet Mail Extensions (MIME) types, plug-ins, types, screen resolution, time zone, cookies, and the like.

The obtained user-specific information may be hashed to become unreadable, while being searchable or identifiable, or fingerprintable. Such hashed user-specific information, which may be associated with a related time stamp, may be temporarily or permanently stored in a local gray-list for possibly not-human-like users and/or machine-like users. Such a gray-list may be stored in a temporary memory located at the computer system 101 or associated therewith.

The input-set 110 of user 113 also be erased from all memories accessibly by the computer system 101. As such, any wrong access to the software-service 111 using the input-set 110, may be reliably prevented.

Creating a counter for wrong input-data of the user 113, or updating such a counter if it already exists. If the counter exceeds a threshold limit, for example three times, or if the counter increases rapidly, for example the counter in increased within seconds of the last counter increase, the return value for the counter indicates a break from attempting to gain access of the software-service 111. Based on such a break, the hashed user-specific information may be stored on a black-list located at the software-service 111 and/or at computer program product 103 owned or licensed by the firm powering the software-service 111. Otherwise, the return value for the counter is indicative of the counting continuing, and the user 113 may be asked again for an input-set 110 i.e. Login/PW, which may be required to be a new input set. Consequently, also a new data-set 115 will be created by the user 113.

It is appreciated that the strictness of the fuzzy based evaluating step 108 depends on the specific ratio of scores to confidence for each specific software-service 211. For example, a login page for a common service only needs a small input-set 110. Thus, the confidence is small, but the corresponding score is high as the inputs of username and password are very stable. On the other hand, a One-Time-Password (OTP) token is a random number and thus the score is very low, as this password often will be different. Similarly, an InternationalBankAccountNumber (IBAN) has a low score as it is different between users, but the confidence associated with such input is high since an IBAN includes a large amount of data.

It shall be explicitly noted that it is unnecessary for feedback to be provided to the user 113 via the browser used by him or via or for a notice to be provided the software-service 111 indicating that access was requested by the user 113, however both types of feedback are possible.

In some embodiments, in order to determine the score and confidence of input, data from input-set 110 and from data-set 115, as well as the number of characters in the input fields, are stored in an Array against each other. When the JavaScript for validation is submitted, every current input that is not of the type "hidden" is identified as having a "name" and a "value" (inputs.type+#+inputs.name), where "value" is the number of characters in the input-data. These "name" and "value" are stored in an array or other collection, which may be labeled "w" and may be in the collected JavaScriptObjectNotation(JSON)-data. When steps 106, 107, 108, and 109 are called, the collected current input-data is compared to the collected input-data in array "w". Specifically, the "value" in the w-Array is checked against the "value" that actually is in the input-data.

When such a comparison is made, if no "w" data has been collected, the "ModuleFlags.INTEGRITY_DATA_MISSING" flag is raised. This can happen if the execution was disrupted or a wrong JavaScript thread was used. If, on the other hand, there is current input with characters in the data-input, but there is no corresponding input in the w-Array with the same "name", the "ModuleFlags.INTEGRITY_CORRUPT" flag is raised to indicate that something is wrong. If the key combination "ctrl+v" appears in the collected data-set 115, the ModuleFlags.INTEGRITY_PASTE flag is raised. If the number of characters in the current input data is the same as, or different from, the number of characters in the data stored in the w-array, a suitable one of the "ModuleFlags.INTEGRITY_IS_THE_SAME", "INTEGRITY_IS_LARGER", "INTEGRITY_IS_SMALLER" flags is raised. If there is collected data in the w-array, that does not have corresponding data in the input-data, the flag "ModuleFlags.INTEGRITY_IS_MISSING" is raised. This can happen, for example, when the user uses autocomplete or pastes data with the mouse.

Another data check comprises checking against the requirements, or "checkAgainstDefinitions", to see whether the received input-data matches the expected input.

The approach described above employs a parallel-layered computer system 101, where each layer can report suspicious behavior individually, if a discovered data irregularity on any modality is established to be statistically serious enough. Both machine-like and non-human like behaviors are flagged as being generated by a potential bot.

Although the present invention was shown and described with references to the preferred embodiments, these are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

The invention claimed is:

1. A computer-implemented method comprising:
receiving, via at least one input module of a user-device, an input-set of data, necessary for a request for access to a software service, said input-set of data consciously generated by a user,
gathering from said user-device a data-set of data dependent at least on an unconscious behavior of said user when using said user-device said data-set including randomized elements,
evaluating, based on said data-set, whether said user exhibits human-like behavior or machine-like behavior, said evaluating including detecting a Gaussian distribution of said randomized elements, thereby to identify said data-set as exhibiting machine-like behavior,
when said evaluating determines that said user exhibits machine-like behavior, or does not determine that said user exhibits human-like behavior, executing a bot-routine.

2. The method of claim 1, wherein said data-set comprises at least one of dwell time data, trajectory data, pressure data, acceleration data, deceleration data, velocity data, data relating to randomness of input, data relating to uniformity of actions, jitter data, pulsation data, distortion data, and life indicator data.

3. The method of claim 1, wherein said evaluating comprises detecting at least characteristic of said user-device, and using known features of user-devices having said at least one characteristic as part of said evaluating, said at least one characteristic including at least one of a type of computer platform, a type of browser, and an operating system used by said user in said user-device.

4. The method of claim 1, wherein said data-set comprises trajectory information relating to a trajectory traveled by a pointing element between two keys of the user-device, and said evaluating comprises identifying at least one of specific keys crossed by said trajectory, a lag-time between key touching being greater than a threshold, deviation from a straight line or curve, and jitter present during traversal of said trajectory, thereby to identify said data-set as exhibiting human-like behavior.

5. The method of claim 1, wherein said data-set comprises information relating to pressure applied by said user to keys of said user-device, and said evaluating comprises detecting at least one of excessive uniformity in said applied pressure and excessive uniformity in the portion of the key to which pressure is applied, thereby to identify said data-set as exhibiting machine-like behavior.

6. The method of claim 1, wherein said gathering takes place prior to said user providing said input-set of data.

7. The method of claim 1, wherein said evaluating comprises evaluating whether a human would be physically able to provide said data in said data-set, and, if said human would not be physically able to provide said data, carrying out said executing step.

8. The method of claim 1, wherein said evaluating comprises actively triggering at least one distortion, expected to cause a specific reaction, discernable in said data-set, if said user-device is operated by said human, thereby to identify whether said user exhibits said human-like behavior.

9. The method of claim 1, wherein said bot-routine includes at least one of:
  interrupting transmission of said input-set from said user-device to said software service;
  identifying said user by obtaining additional user information or system information;
  storing said obtained additional user information or system information in hashed form in a list of users suspected not to be human;
  erasing said input-set from said user-device;
  creating a counter tracking the number of times wrong input data was provided for the user, or updating said counter; and
  if said counter exceeds a threshold, or increases rapidly, storing said obtained additional user information or system information in hashed form in a black list of users.

10. The method of claim 1, wherein said evaluating comprises comparing the number of characters in an input field of a data collection form with the number of characters in said data input, thereby to determine at least one of a score and a confidence of the received input data.

11. A computer program product comprising a non-transitory computer-usable medium including instructions which, when executed by a computer, cause the computer to:
  receive an input-set of data, necessary for a request for access to a software service, said input-set of data consciously generated by a user,
  gather from a user-device operated by said user a data-set of data dependent at least on an unconscious behavior of said user when using said user-device, said data-set including randomized elements,
  evaluate, based on said data-set, whether said user exhibits human-like behavior or machine-like behavior, said instructions to evaluate cause the computer to detect a Gaussian distribution of said randomized elements, thereby to identify said data-set as exhibiting machine-like behavior, and
  when said evaluation indicates that said user exhibits machine-like behavior, or does not indicate that said user exhibits human-like behavior, execute a bot-routine.

12. The computer program product of claim 11, wherein said data-set comprises at least one of dwell time data, trajectory data, pressure data, acceleration data, deceleration data, velocity data, data relating to randomness of input, data relating to uniformity of actions, jitter data, pulsation data, distortion data, and life indicator data.

13. The computer program product of claim 11, wherein said instructions cause the computer to detect at least characteristic of said user-device, and to use known features of user-devices having said at least one characteristic in order to perform said evaluation, said at least one characteristic including at least one of a type of computer platform, a type of browser, and an operating system used by said user in said user-device.

14. The computer program product of claim 11, wherein said instructions cause said computer to actively trigger at least one distortion, expected to cause a specific reaction, discernable in said data-set, if said user-device is operated by said human, thereby to evaluate whether said user exhibits said human-like behavior.

15. A computer system comprising:
  at least one input module adapted to receive input consciously provided by a user;
  at least one sensor adapted to gather data from a user, the user not being conscious of said data being gathered; and
  one or more processors, the processors being configured to:
  receive from said at least one input module an input-set of data, necessary for a request for access to a software service, said input-set of data consciously generated by a user,
  gather from said at least one sensor a data-set of data dependent at least on a unconscious behavior of said user when using a user-device, said data-set including randomized elements,
  evaluate, based on the data-set, whether said user exhibits a human-like behavior or a machine-like behavior, said evaluation including detecting a Gaussian distribution of said randomized elements, thereby to identify said data-set as exhibiting machine-like behavior, and
  when said evaluation indicates that said user exhibits machine-like behavior, or does not indicate that said user exhibits human-like behavior, execute a bot-routine.

16. The computer system of claim 15, wherein said data-set comprises at least one of dwell time data, trajectory data, pressure data, acceleration data, deceleration data, velocity data, data relating to randomness of input, data relating to uniformity of actions, jitter data, pulsation data, distortion data, and life indicator data.

17. The computer system of claim 15, wherein said processor is programmed to detect at least characteristic of said user-device, and to use known features of user-devices having said at least one characteristic in order to perform said evaluation, said at least one characteristic including at least one of a type of computer platform, a type of browser, and an operating system used by said user in said user-device.

18. The computer system of claim 15, wherein said processor is programmed to actively trigger at least one distortion, expected to cause a specific reaction, discernable in said data-set, if said user-device is operated by said human, thereby to evaluate whether said user exhibits said human-like behavior.

* * * * *